June 11, 1957　　F. C. WALTHER　　2,795,266
SEAT MECHANISM
Filed Jan. 15, 1953　　　　　　　　　　　4 Sheets-Sheet 2
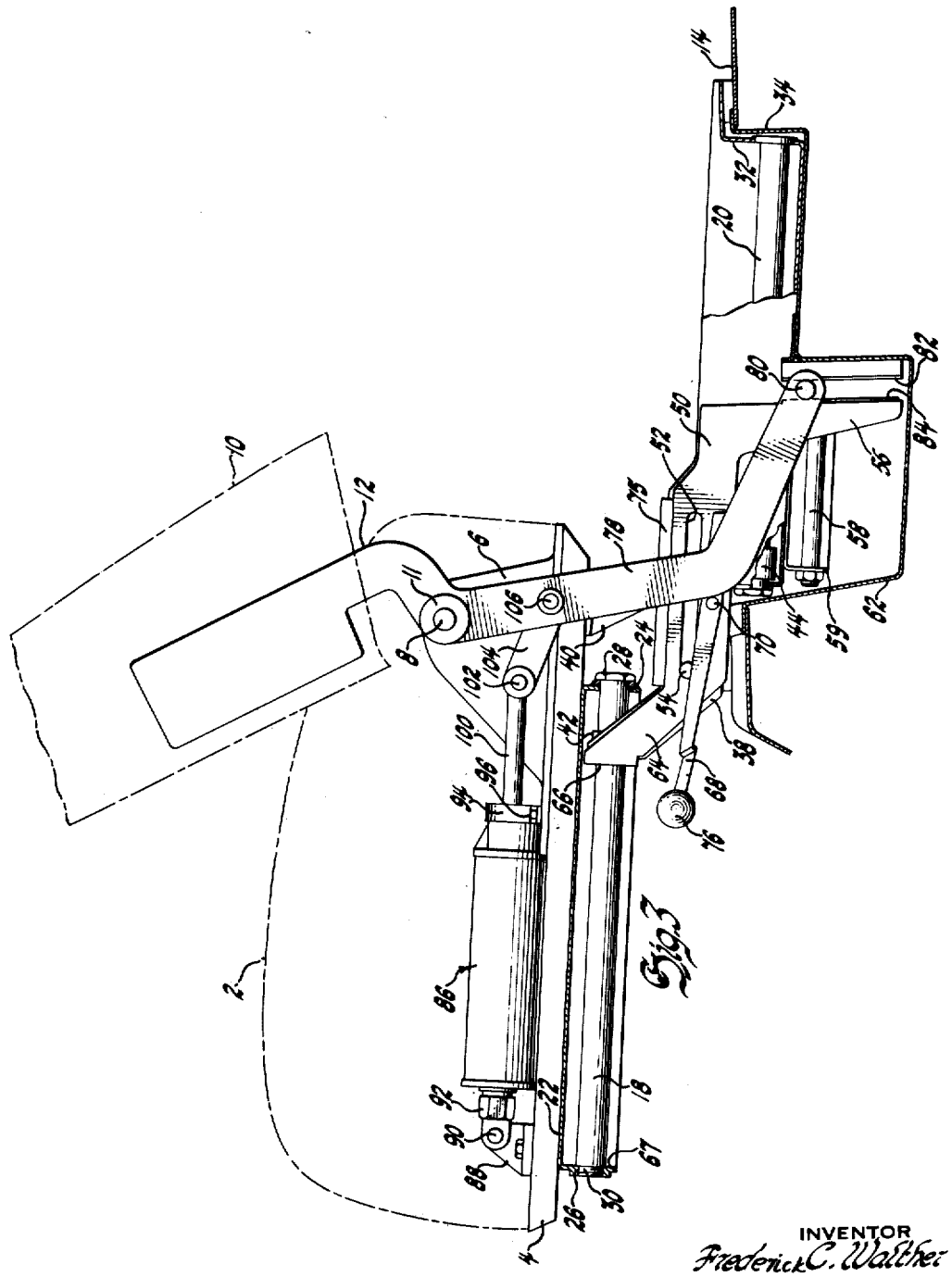
INVENTOR
Frederick C. Walther
BY
Williston Helmig & Baillio
ATTORNEYS

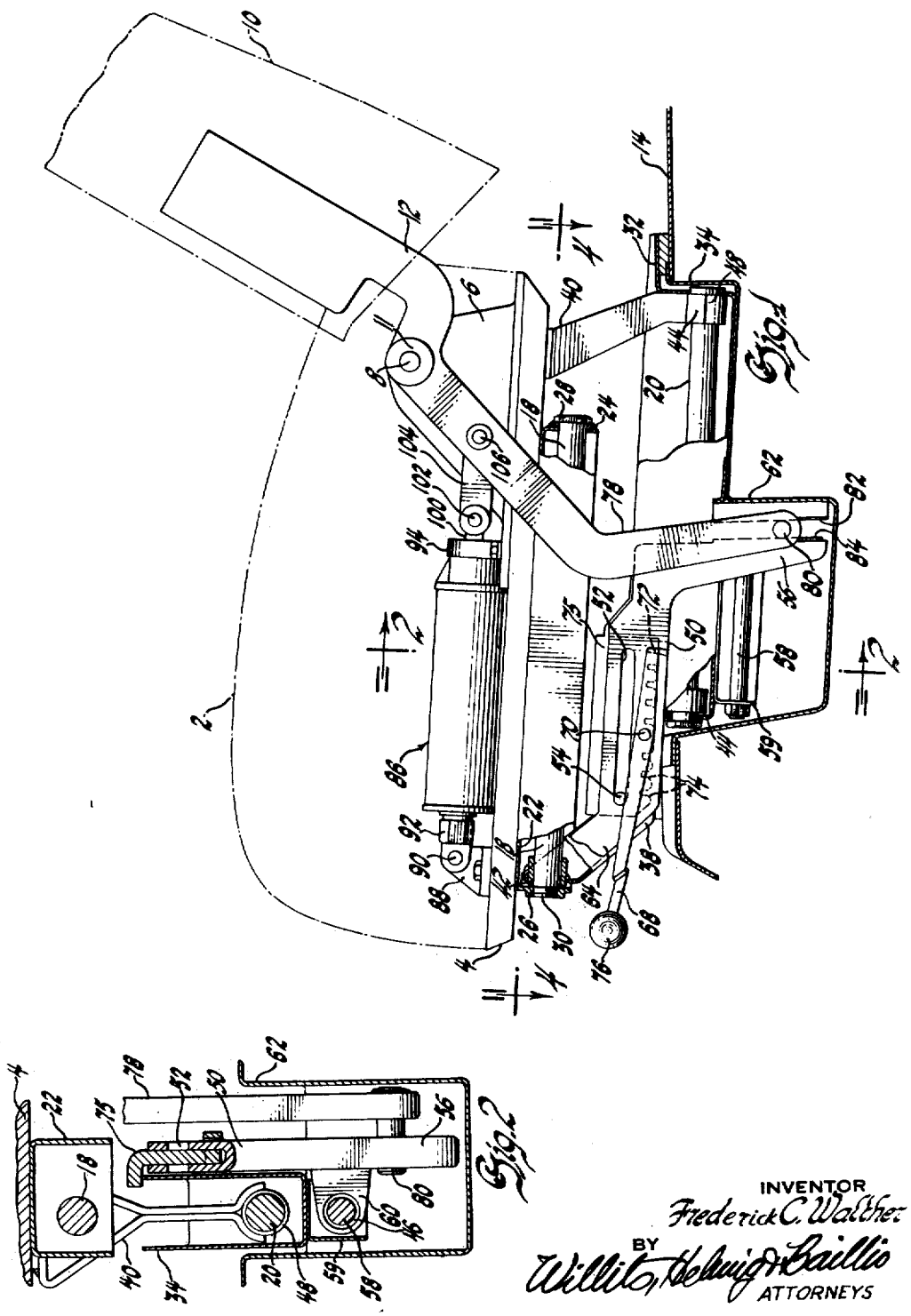

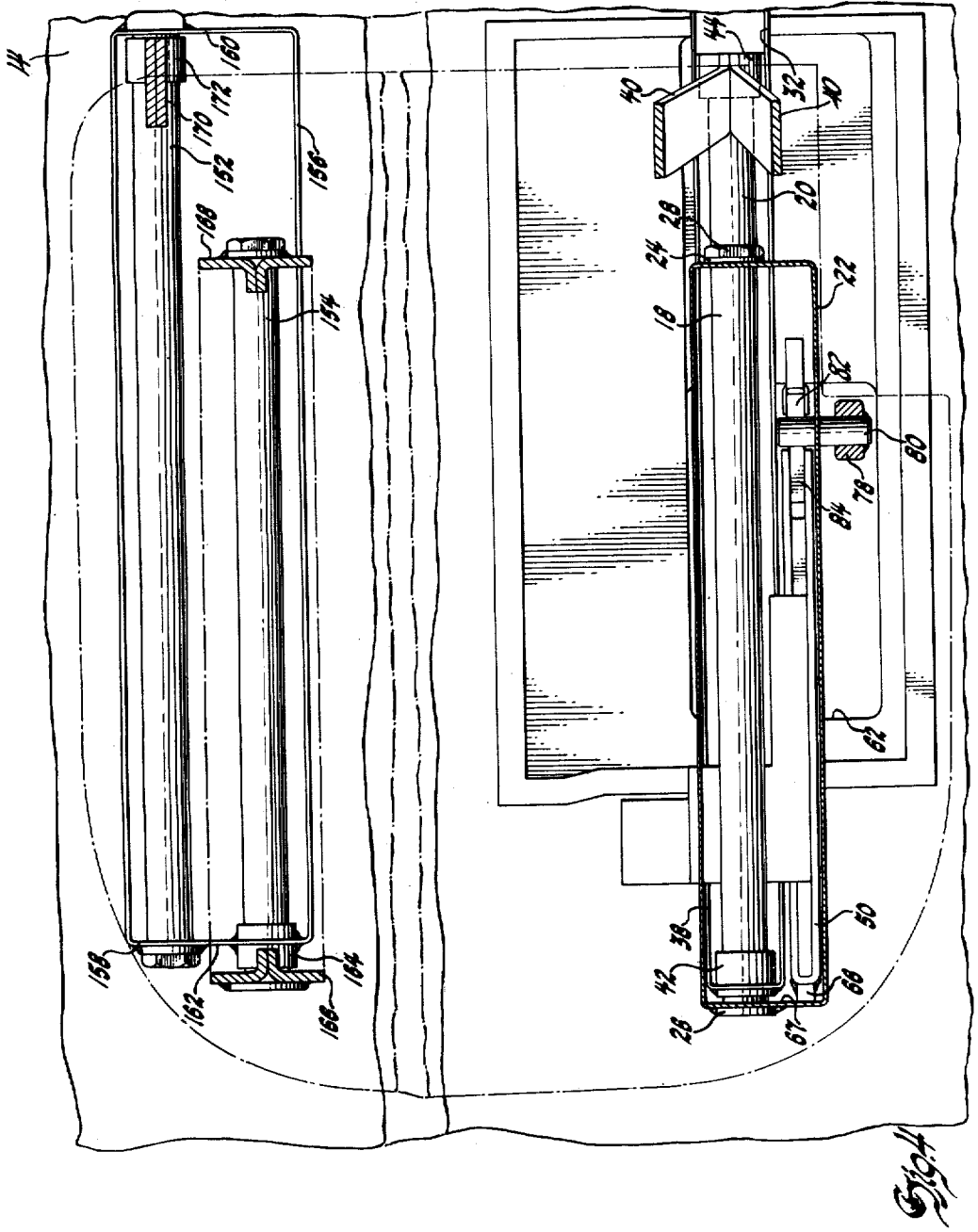

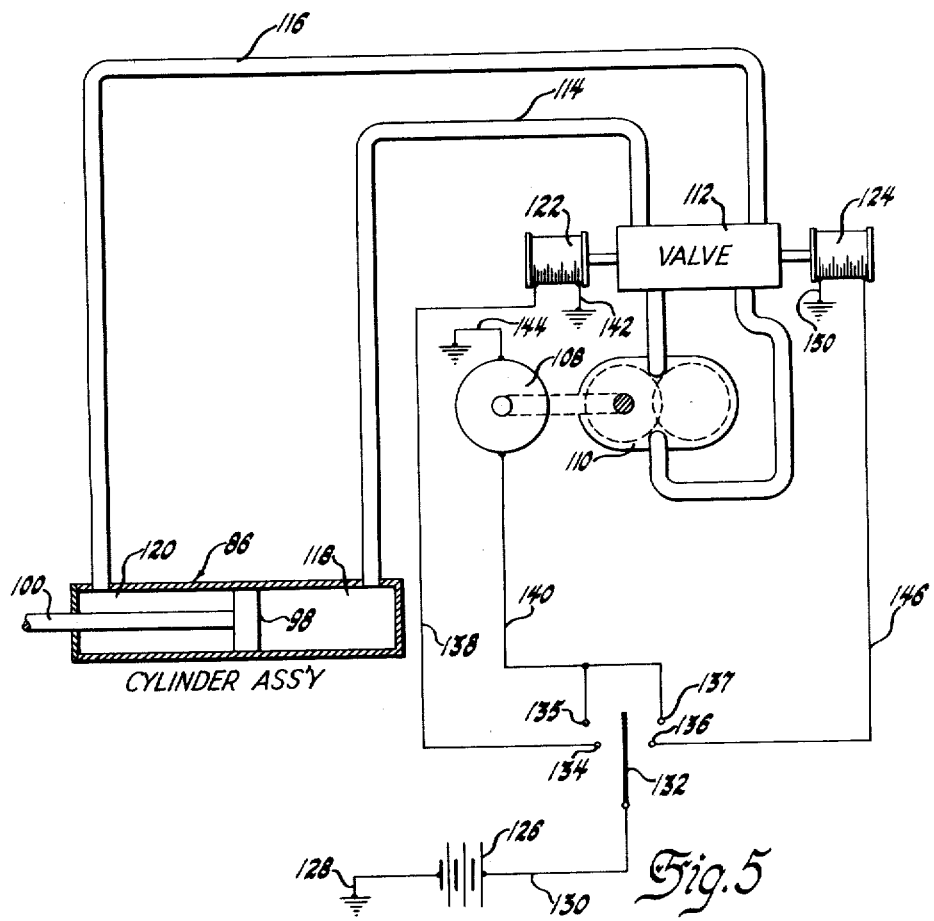

United States Patent Office 2,795,266
Patented June 11, 1957

2,795,266

SEAT MECHANISM

Frederick C. Walther, Grosse Pointe, Mich., assignor to General Motors Corporation, Detroit, Mich., a corporation of Delaware Application January 15, 1953, Serial No. 331,343

11 Claims. (Cl. 155—14)

This invention relates to adjustable seats for two door vehicles and particularly to seats adapted to be bodily displaced in response to tilting movement of the seat back.

It is well known in the art to provide front seats for two door vehicles wherein tilting movement of the seat back produces linear or angular movement of the entire seat in order to temporarily increase the clearance between the seat and the door jamb. The space thus provided substantially reduces the difficulty encountered by passengers entering and aligning from the rear seat. In the past such mechanisms have provided only limited additional clearance. Because of the growing popularity of extremely low silhouette body construction, entrance into the rear seat has become increasingly difficult. Therefore considerably increased temporary clearance is necessary to offset the increased difficulty produced by the evolution in body styling.

In the conventional channel type seat adjuster mechanism, temporary forward movement of the seat has been limited to less than six inches or approximately one-half the overall length of rails. Because of inherent mechanical characteristics, channel type adjusters fail to function smoothly beyond this limit. In addition, movement beyond this limit causes the effective supporting points for the seat to rapidly approach each other, at which time the seat mounting becomes unstable.

One object of the present invention is to provide an improved adjustable front seat having mechanism responsive to tilting movement of the seat back which is adapted to provide greatly increased clearance for passengers entering or alighting from the rear seat.

Another object is to provide an adjustable front seat of the type described having a tiltable back portion which is automatically operable from a remote station.

A further object is to provide a seat structure of the type described having an adjuster mechanism wherein the load supporting points are relatively widely seperated irrespective of the position of adjustment of the seat.

Still another object is to provide a seat adjuster mechanism of the type described wherein the seat is temporarily movable a distance substantially equivalent to the overall length of the adjuster mechanism.

Other objects and advantages of the inevention will become more fully apparent from the following description wherein reference is made to the accompanying drawings.

In the drawings:

Figure 1 is a side elevational view with parts broken away and partly in section, showing the arrangement and disposition of the seat, the fore and aft adjuster rails and the actuating mechanism.

Figure 2 is an enlarged fragmentary front elevational view, partly in section, taken substantially along the lines 2—2 of Figure 1.

Figure 3 is a side elevational view, similar to Figure 1 with parts broken away and partly in section, showing the relative position of the parts when the seat is in the full forward temporary position and Figure 4 is a plan view, partly in section, taken substantially along the line 4—4 of Figure 1.

Figure 5 is a schematic diagram of the hydraulic control mechanism.

Referring now to the drawings and particularly Figures 1 and 2, there is shown a vehicle seat wherein the numeral 2 designates a horizontally disposed cushion which is supported on and secured to a seat frame 4. At each side of seat frame 4 near its rear edge, there are provided a pair of struck-up portions 6 to which are secured laterally aligned outwardly extending trunnions 8. A normally vertically disposed seat back 10 is pivotally mounted for swingable movement about trunnion 8 by journals 11 formed in the downwardly depending arm portions 12 which are secured to the seat back 10. Swingable forward and backward movement of seat back 10 over cushion 2 is accomplished in a manner to be described later herein.

To provide for both temporary and permanent fore and aft adjustment of the seat there are provided a pair of substantially parallel longitudinal guide mechanisms which are disposed between the seat frame 4 and the vehicle floor 14 at each edge of the seat, respectively. Since the inner mechanism differs from the outer mechanism only in certain minor details to be pointed out later herein, a description of the outer mechanism will be understood to apply to both. In accordance with the present invention, the outer adjusting mechanism includes longitudinally staggered vertically offset tubular rails 18 and 20. Rail 18 is secured to the base of the seat frame 4 by means of an elongated rectangular housing 22 which is attached to underside of the said frame by welding or other suitable means. Rectangular housing 22 is provided with a reinforced flange aperture 24 at one end and an internally threaded reinforced flanged aperture 26 at the other end. Tubular rail 18 is formed with a hexagonal head 28 at the one end and is provided with a reduced threaded end portion 30 at the other end thereof. Tubular rail 18 is mounted in housing 22 by endwise insertion through the rear aperture 24 thereof and subsequent rotation to threadably engage threaded portion 30 with threaded aperture 26. Lower rail 20 is generally similar to upper rail 18 and is disposed in an elongated rectangular housing 32 similar to housing 22. Housing 32 is secured in a well 34 recessed in the floor 14 of the vehicle. To accomplish slidable movement of the seat along rails 18 and 20, there are provided a pair of connector legs 38 and 40 having circular collars 42 and 44 formed at the respective ends thereof. Collars 42 and 44, respectively, encircle and slidably cooperate with rails 18 and 20, respectively. At their opposite ends connector legs 38 and 40 are bent to form flattened securing surfaces which are secured to the base of the seat frame 4 and the floor 14 of the vehicle, respectively, by bolts or other suitable means. It will be seen that the rail 18 and connector leg 40 are secured to the seat frame 4 while rail 20 and connector leg 38 are secured to the floor 14. Therefore, when the seat is moved fore and aft, rail 18 slides through circular collar 42 of fixed connector leg 38 secured to the floor while the circular collar 44 of connector leg 40 slides along the rail 20 secured in the well 34 formed in the floor. In this manner, greatly increased linear movement of the seat may be had, since the upper rail 18 may move fore and aft throughout substantially its entire length while the rear connector leg 40 may move fore and aft substantially throughout the entire length of the lower rail 20. As seen best in Figure 1, when in the normal position, the seat is supported at points located substantially at the forwardmost limit of upper rail 18 and the rearwardmost limit of the lower rail 20, which points are substantially at the front and rear edges of the seat, respectively, thus providing unusually widely spaced support for the seat.

To assure smooth and silent sliding movement of each of the rails 18 and 20, circular collars 42 and 44 of legs 38 and 40 are provided with nylon bushings 46 and 48 which slidably cooperate with the rails 18 and 20. By providing bushings of this type, smooth, rattle free operation is assured. In addition such bearings eliminate scouring of the rails and require no lubrication.

To provide for adjusting the seat to various permanent positions to accommodate passengers of various heights there is provided a position regulator comprising a generally L-shaped relatively flat adjuster plate 50. An elongated horizontal slot 52 formed in the midportion of plate 50 permits the said plate to move longitudinally along an outwardly extending stud 54 secured to a lower connector leg 38. At its rear downwardly depending end 56, plate 50 is slidably connected at a second point to a relatively short longitudinally extending tubular rail 58 by means of an apertured inwardly projecting tab 60 secured to the plate. A nylon bushing disposed in the apertured tab 60 performs the same function previously described with respect to rails 18 and 20. Rail 58 is mounted in elongated housing 59 secured at the base of housing 32 and extends into a second depending wall 62 formed in the floor 14 adjacent well 34. At is forward end adjuster plate 50 is provided with an upwardly and forwardly inclined portion 64 having a shoulder 66 which normally abuts the forward inner surface 67 of elongated housing 22 in axial alignment with collar 42. When the seat is in the full rearward fixed position abutment 64 is disposed immediately laterally adjacent collar 42. A manual operating lever 68 is pivotally secured to plate 50 on a pivot stud 70 and is spring urged in a counterclockwise direction by a suitable spring, not shown. At its rear extremity, lever 68 is provided with an inturned blade 72 which is adapted to engage one of a series of longitudinally spaced notches 74 formed on a plate 75. Plate 75 is rigidly secured to the forward connector leg 38, as by welding. In order to move the seat to any desired position, manual upward pressure is exerted on the ball end 76 of lever 68, causing the blade 72 to move downwardly out of engagement with the slot in plate 75. Thereafter, the seat is manually moved forward along the rails 18 and 20 to the desired position and lever 68 is released permitting blade 72 to swing upwardly to engage a notch 74 corresponding with the new position of the seat. As plate 50 is moved forwardly to position the seat, abutment 66 of plate 50 moves progressively away from the collar 42 of leg 38. It will therefore be seen that the function of abutment 66 is to provide a stop for the flange 26 of housing 20 thus defining the position of adjustment of the seat.

In order to temporarily move the seat longitudinally in response to tilting movement of the seat back 10, hinge arm 12 is provided with an integral extension 78 bent to extend forwardly and downwardly. Near its lower extremity, extension 78 is provided with a stud 80 which extends laterally inwardly between a fixed abutment 82 secured in the well 34 and an abutment 84 secured to the rear edge of adjuster plate 50. Since abutment 82 resists rearward movement of stud 80, forward tilting movement of the seat back 10 reacts against trunnion 8 forcing the seat to slide along rails 18 and 20 to the position shown in Figure 3. Conversely, when the seat is in the position shown in Figure 3, rearward tilting movement of the seat back 10 causes the stud 80 to strike the abutment 84 of adjuster plate 50 which resists forward movement of stud 80 causing the extension 78 to react against trunnion 8 in the opposite direction to move the seat back to the normal position shown in Figure 1. As pointed out previously, abutment 66 of plate 50 defines the fixed position of adjustment of the seat. In this connection it is to be noted that stud 80 functions to prevent forward movement of the flange 26 away from abutment 66 when the seat back 10 is in the normal substantially vertical position, since the distance between flange 26 and the normal position of stud 80 is always equal to the distance between the abutment 66 and the flange 84.

To eliminate the necessity of operating the seat manually when it is desired to enter the rear seat, there is provided a hydraulic cylinder assembly 86 comprising a bracket 88 which is secured on seat frame 4 by a pin 90 and clevis 92. At the rear end of cylinder assembly 86, a U-shaped yoke 94 is bolted to seat frame 4 by bolts 96. Yoke 94 limits vertical movement of the cylinder about pin 90. A piston rod 98 is slidably disposed in the cylinder and is provided with rearwardly extending piston rod 100 which extends rearwardly out of cylinder 86 and is pivotally connected by means of a pin 102 to a link 104 which in turn is pivotally secured on a stud 106 formed on extension 78 a suitable distance below the trunnion 8. By means of a suitable controlled source of hydraulic pressure, illustrated schematically in Figure 5, the piston rod 100 may be selectively actuated rearwardly and forwardly to swing the seat back hinge arm extension 78 rearwardly and forwardly. Therefore, the seat back 10 will selectively tilt forwardly and rearwardly to impart forward or rearward movement to the seat, in the manner previously described. Since the piston rod 100 is limited to generally horizontal movement, while the stud 106 rises and falls in an arcuate path, it will be seen that the purpose of link 104 is to permit linear movement of the piston rod to be translated to arcuate movement in the extension 78.

A suitable controlled source of hydraulic pressure may be provided in the manner schematically illustrated in Figure 5 wherein an electric motor 108 operates a unidirectional pump 110 which directs hydraulic fluid under pressure through a reversing valve 112 to conduits 114 and 116. Conduits 114 and 116, respectively, communicate with the forward and rearward chambers 118 and 120, respectively, of the cylinder 86. Upon slidable movement of valve 112 in one direction hydraulic fluid is directed through conduit 114 into chamber 118 while permitting return of hydraulic fluid from chamber 120 through conduit 116 to pump 110. When valve 112 is slidably moved in the opposite direction, the direction of flow of the hydraulic pressure from pump 110 is reversed and directed through conduit 116 into chamber 120 while permitting the return of fluid in the chamber 118 through conduit 114 to pump 110. It will, therefore, be seen that the direction movement of piston 98 is controlled by valve 112. To permit the valve 112 to be controlled from any desired location in the vehicle, movement of the valve is controlled by solenoids 122 and 124. By selectively energizing solenoid 122 or 124, valve 112 may be moved in either direction.

To energize either solenoid 122 or 124 simultaneously with pump motor 108, there is provided a source of power 126 which is connected to ground by lead wire 128 and connected to a conveniently disposed switch contact 132 by lead wire 130. Switch contact 132 is alternately movable to the left to engage with terminals 134 and 135 and to the right to energize terminals 136 and 137. Terminal 134 is connected by lead wire 138 to solenoid 122 and terminal 135 is connected by lead wire 140 to motor 108. Solenoid 122 and motor 108 are in turn connected to ground, respectively, by lead wires 142 and 144. Terminal 136 is connected by lead wire 146 to solenoid 124 and terminal 137 is connected by lead wire 140 to motor 108. Solenoid 124 is in turn connected to ground by lead wire 150. It will, therefore, be seen that when switch contact 132 engages terminals 134 and 135, pump motor 108 and solenoid 122 will be simultaneously operated causing hydraulic pressure to be directed in one direction while movement of switch contact 132 into engagement with terminals 136 and 137 will cause the pump motor 108 and solenoid 124 to be simultaneously operated resulting in a reversal of the direction of flow of the hydraulic fluid.

The switch 132 for the hydraulic actuator is preferably mounted on the door of the vehicle adjacent the bank of switches commonly provided on vehicles having hydraulically operated tops, windows, etc. In addition to completely eliminating physical effort when it is desired to gain access to the rear seat, the mechanism has the additional advantage of eliminating seat back jack-knifing commonly resulting from rapid deceleration of the vehicle. Since the hydraulic cylinder effectively resists the force of inertia tending to tilt the seat back, even under extreme conditions jack-knifing would occur at a greatly reduced rate.

Because of the low floor level common in current motor vehicle bodies, it is usually necessary to provide a longitudinally extending trough or channel in the floor to provide sufficient clearance for the propeller shaft. Consequently, the floor level in the midsection of the vehicle is upwardly offset with reference to the remainder of the floor. Since this difference in floor level considerably reduces the vertical space available for the inboard adjuster rails when bucket-type seats are employed, the inboard rail construction differs from the outboard rail construction in certain respects. As shown in Figure 4, the staggered rails 152 and 154 are disposed in laterally offset relation.

Rectangular housing 156 is secured to the floor 14 of the vehicle and is provided with longitudinally aligned flanged apertures 158 and 160 at the front and rear thereof. Rail 152 is disposed and secured in the said flanged apertures in the same manner as previously described with reference to rail 18. At its forward end 162, laterally adjacent flanged aperture 158, housing 156 is provided with a bushing or collar 164 which is adapted to slidably receive rail 154. Rail 154 is in turn secured to seat frame 4 by brackets 166 and 168. Since collar 164 is indirectly secured to the floor 14 by housing 156, it will be seen that it functions in a manner similar to fixed connector leg 38, previously described. A single connector leg 170 is secured to the seat frame and is provided with a circular collar 172 adapted to slide along rail 152. During fore and aft movement of the seat, collar 172 of connector leg 170 slides along rail 152 as rail 154 slides through bushing 164 secured in housing 156.

Because of the close proximity of the inboard and outboard rail assemblies, it is unnecessary to provide the inboard rails with the actuating and adjusting mechanism associated with the outboard rails, the sole purpose of the inboard rail assembly being to provide slidable support for the inner edge of the seat.

While the invention has been shown as applied to a bucket-type seat it is manifest that the device is equally applicable to a full width bench-type seat having split tiltable back portions. When applied to a seat of this type the adjuster mechanism at each side of the seat may be identical with the outer adjuster mechanism previously described. In the event that it is desired to provide a full width bench-type seat in a vehicle having a substantially flat floor surface, laterally offset rails may be utilized at both sides of the seat, since it is unnecessary to provide clearance for the propeller shaft.

From the foregoing it will be seen that a novel and highly improved seat mechanism has been devised which permits greatly increased temporary displacement of the seat responsive to tilting movement of the seat back. The device not only substantially increases the space available for passengers entering and alighting from the rear seat, but has the further advantage of considerably increasing the longitudinal spacing between the seat supporting points which improves the stability of the seat. In addition, the remotely controlled automatic operating means for the seat back eliminates virtually all physical effort incident to gaining access to the rear seat.

While but a single embodiment of the device has been shown and described, it is apparent that other changes and modifications may be adopted without departing from the invention. It is to be understood, therefore, that it is not intended to limit the invention to the single embodiment shown but only by the scope of the claims which follow.

I claim:
1. In an adjuster mechanism for a vehicle seat, a stationary rail and a rail movable with said seat, said rails being disposed in longitudinally overlapping relation, a stationary guide for said movable rail and a guide secured to said seat for movement along said fixed rail.

2. In an adjuster mechanism for a vehicle seat having a tiltable back portion, a longitudinal adjuster mechanism comprising staggered guide rails, one of said rails being fixed and the other of said rails being secured to the seat for movement therewith, a pair of guides cooperating with said rails, one of said guides being fixed and the other of said guides being secured to the seat for movement therewith, an adjustable member slidably disposed on said fixed guide and cooperating with said rail fixed to said seat, said member being adapted to retain said seat in a plurality of fixed positions, and means with said back portion whereby said seat may be temporarily bodily displaced fore and aft in response to tilting movement of said back portions.

3. In a vehicle seat structure having a tiltable back portion, the combination of seat supporting means disposed at opposite sides of said seat thereof, each of said means comprising a pair of substantially parallel longitudinally staggered guide rails and a pair of guide members cooperating with said rails, one of said rails and one of said guides being secured to said seat, the other of said rails and the other of said guides being secured to said vehicle whereby said seat may be moved fore and aft substantially the total length of one of said rails, and means on said back portion adapted to move said seat fore and aft in response to tilting movement of said back portion.

4. In a seat structure having a tiltable back portion, supporting means for said seat comprising a movable rail slidable in a fixed guide and a movable guide slidable along a fixed rail, said rails being disposed in substantially parallel longitudinally staggered relation, seat adjuster means on said supporting means, a fixed abutment, a second abutment on said adjuster means, a hinge arm for said back portion, and a projection on said arm alternately engageable with said fixed abutment and said second abutment in response to tilting movement of said seat back forwardly and backwardly, respectively, whereby said seat may be moved fore and aft along said supporting means.

5. In a seat having a normally upright back portion pivotally secured thereon, the combination of spaced apart supporting members for said seat, each of said supporting members comprising an elongated rail and a guide member secured in longitudinal alignment on said seat, an elongated rail and a guide member secured in longitudinal alignment on said vehicle, said first mentioned rail being slidable in said last mentioned guide and said first mentioned guide being slidable along said last mentioned rail, means for retaining said seat in a plurality of fixed positions when said back portion is in the normally upright position, depending means on said back portion responsive to tilting movement thereof for temporarily forwardly displacing said seat from said fixed position, and remotely energized means for tilting said back portion.

6. In an adjustable seat having a normally upright back portion, tiltable to displace said seat, the combination of spaced apart supporting members for said seat, each of said supporting members comprising an elongated rail and a guide member secured in longitudinal alignment on said seat, an elongated rail and a guide member secured in longitudinal alignment on said vehicle, said first mentioned rail being slidable in said last mentioned guide and said first mentioned guide being slidable along said last mentioned rail, means for retaining said seat in a plurality of fixed positions when said back portion is in the normally upright position, means responsive to tilting movement of said back portions for temporarily forwardly displacing said seat from said fixed position, and remotely controlled means for tilting said back portion, said means being adapted to resist tilting movement of said seat back when said vehicle is rapidly decelerated.

7. The invention as set forth in claim 5 wherein said remotely energized means comprises a thrust producing mechanism disposed between said seat and said back portion.

8. The invention as set forth in claim 5 wherein said remotely energized means comprises a hydraulic thrust producing mechanism disposed between said seat and said back portion.

9. In an adjustable seat having a normally upright back portion tiltable to displace said seat, the combination of depending hinge arms secured to said back portion, said arms being pivotally secured to said seat, spaced apart longitudinal guide mechanisms for said seat, an adjuster plate adapted to retain said seat in a plurality of fixed positions along said guide mechanisms when said back portion is in the normally upright position, means formed on at least one of said hinge arms adapted to temporarily move said seat forwardly of said fixed position in response to forward tilting movement of said seat back and to return said seat to said fixed position in response to rearward tilting movement of said seat back, and an hydraulic cylinder assembly secured to said seat, said assembly including a piston having a rod secured thereto, said rod having its free end pivotally connected to said hinge arm whereby upon actuation of said piston said seat back may be tilted forwardly and backwardly.

10. In a vehicle seat structure having a horizontally disposed seat and a normally upwardly disposed forwardly tiltable back portion pivotally secured to said seat, the combination of substantially parallel supporting means disposed at opposite sides of said seat, each of said means comprising a pair of tubular rails and a pair of guide members having sleeve portions adapted to slidably cooperate with said rails, one of said rails and one of said guides being secured in longitudinal alignment on said vehicle, the other of said rails and the other of said guides being secured in longitudinal alignment on said seat, a member slidably adjustable on said guide secured to said vehicle and cooperating with said rail secured to said seat, said adjustable member being adapted to normally prevent rearward movement of said seat, a depending arm secured to said back portion, said arm having projecting means normally engaging said adjustable member to limit forward movement of said seat, said projecting means being adapted upon tilting movement of said seat back to urge said seat forwardly along said adjuster mechanism.

11. In a seat having a tilting back portion adapted to actuate said seat along a support, a frame for said seat slidably engaging said support, a power operated mechanism for tilting said back portion, said mechanism being mounted on said seat frame and arranged to react against said back portion, and a remotely positioned control for energizing said power operated mechanism.

References Cited in the file of this patent

UNITED STATES PATENTS

| | | |
|---|---|---|
| 1,636,078 | Schreiber | July 19, 1927 |
| 2,189,396 | Greig | Feb. 6, 1940 |
| 2,263,834 | Andersen | Nov. 25, 1941 |
| 2,266,010 | DeVeau | Dec. 16, 1941 |
| 2,352,358 | Andersen | June 27, 1944 |
| 2,428,217 | Hedley et al. | Sept. 30, 1947 |
| 2,432,895 | Horton | Dec. 16, 1947 |
| 2,591,426 | Hadley | Apr. 1, 1952 |
| 2,600,005 | Kronhaus et al. | June 10, 1952 |
| 2,647,558 | Rappl | Aug. 4, 1953 |
| 2,660,223 | Appleton | Nov. 24, 1953 |

FOREIGN PATENTS

| | | |
|---|---|---|
| 164,072 | Switzerland | Dec. 1, 1933 |
| 249,708 | Italy | Aug. 7, 1926 |
| 534,261 | Germany | Sept. 24, 1931 |
| 620,815 | Great Britain | Mar. 30, 1949 |

UNITED STATES PATENT OFFICE
CERTIFICATE OF CORRECTION

Patent No. 2,795,266

June 11, 1957

Frederick C. Walther

It is hereby certified that error appears in the printed specification of the above numbered patent requiring correction and that the said Letters Patent should read as corrected below.

Column 6, line 26, after "means" insert -- associated --.

Signed and sealed this 15th day of October 1957.

(SEAL)
Attest:

KARL H. AXLINE
Attesting Officer

ROBERT C. WATSON
Commissioner of Patents